March 7, 1944.  V. J. GIUSEFFI  2,343,660

TIRE

Filed Aug. 3, 1942

INVENTOR
Vincent J. Giuseffi
BY Angelo M. Pisarra
ATTORNEY

Patented Mar. 7, 1944

2,343,660

UNITED STATES PATENT OFFICE 2,343,660

TIRE

Vincent J. Giuseffi, West Orange, N. J.

Application August 3, 1942, Serial No. 453,365

2 Claims. (Cl. 152—293)

This invention relates to tires and more particularly to novel tires for vehicles such as automobiles or the like.

The main purpose of the present invention is to provide a novel tire which may be made up of a number of inexpensive interchangeable units and which requires only a small quantity of resilient and easily replaceable material as its wearing surface. Other objects and advantages of the invention will be readily apparent from the following description and drawing, wherein.

Figure 1:
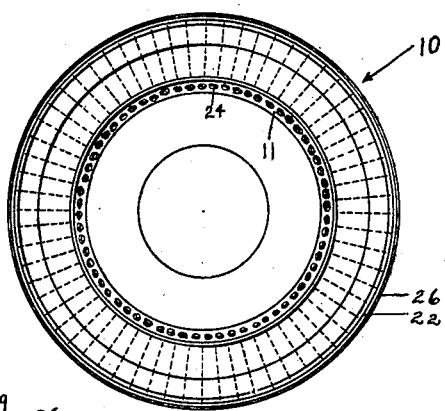
Figure 1 is a view in front elevation of an automobile wheel embodying my invention.

As shown in the drawing, there is a wheel 10 including a rim 11 which may be fixedly or demountably secured thereto. The rim 11 has a number of sets of openings therein. As shown, each set of openings consists of three openings 12, 13 and 14, with the opening 13 being on the circumferential center line of the rim 11. In line with opening 13, on the line at right angles to said circumferential center line and equally spaced from opening 13 are the openings 12 and 14. These sets of openings 12, 13 and 14 are equally spaced from each other and are disposed around the circumference of said rim 11.

Mounted on the rim 11 are a plurality of collars or bands 15 of the desired thickness and composed preferably of a spring metal, such as spring steel. Each of the collars 15 is preferably a section of a hollow annular body whose sides are defined by a pair of radial planes through the center point of the annular body. The sections 15 are identical in all respects, with the sides thereof converging towards the bottom. Each section 15 has a plurality of narrow slots 9 in predetermined positions therein. Each section 15 has a pair of short cylindrical lugs 16 and 17 welded or in some other manner secured thereto. These lugs 16 and 17 are disposed diametrically opposite each other, with the lug 16 being smaller than the lug 17. The lug 16 is located on that portion of section 15 which is of narrowest widthwise dimension and the lug 17 is located on that portion of section 15 which is of greatest widthwise dimension. A compression spring 18 is located in section 15 and has its ends welded to the lugs 16 and 17. I prefer that spring 18 be of the spirally coiled type and that its coils be of gradually decreasing diameter from the lug 17 to the lug 16. Secured to each section 15 at the place of its narrowest dimension and at the center thereof is a short pin 19 which depends therefrom and is adapted to fit snugly into said opening 13. The pin 19 is in line with the longitudinal center line of the spring 18. An opening 20 is located on either side of said pin 19 and secured to said section 15 and extending inwardly thereof is a boss 21 having a threaded opening communicating with said opening 20. When a section 15 is mounted on the rim 11, with the pin 19 fitting into the opening 13, the openings 20 will be in alignment with the openings 12 and 14.

The entire outer face of each section 15 may be covered with a wear-resistant covering 22 such as leather or the like. The covering 22 may be secured to the section 15 by means of rivets not shown. When the entire outer face of section 22 is covered, it has an appropriate opening through which extends pin 19 and also openings in alignment with openings 20. The covering 22 need not necessarily cover the entire outer face of collar 15, its ends may terminate at such places thereon that when the collar is mounted on the rim 11, its ends will be adjacent the edges of the rim 11.

Figure 2:
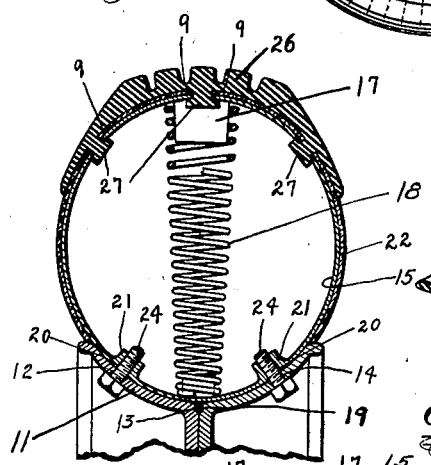
Figure 2 is a cross-sectional view of one of the sections embodying my invention and illustrating the novel manner in which it is secured to the rim of a wheel.
Figure 3:
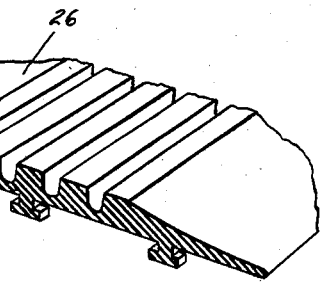
Figure 3 is a fragmentary cross-sectional view of the outer tread covering.

The sections or collars 15 may be mounted on the rim 11, in side edge abutting relationship to form a complete annulus as shown in Figure 1. The unitary elements shown in Figure 2 are handled individually and are placed one after another on rim 11. The method of assembly involves placing a collar unit as shown in Figure 2 on the rim, with the pin 19 located in an opening 13 and pivoting the same on pin 19 until the openings 20 are in alignment with openings 12 and 14. Then bolts 24 extend through openings 12 and 14 and make threaded engagement with bosses 21. These bolts 24 are tightened against the sides of rim 11.

A wear-resistant strip 26 of rubber or the like may be placed over a portion of the leather covering 22. Secured to the strip 26 and depending therefrom are a plurality of metal or rubber locking devices 27, which may be in the form of inverted T's.

One end of strip 26 is placed over the mounted section 15 with the shank of each T located in the slots 9 and the cross of each T, bearing against the under face of collar 15.

Figure 4:
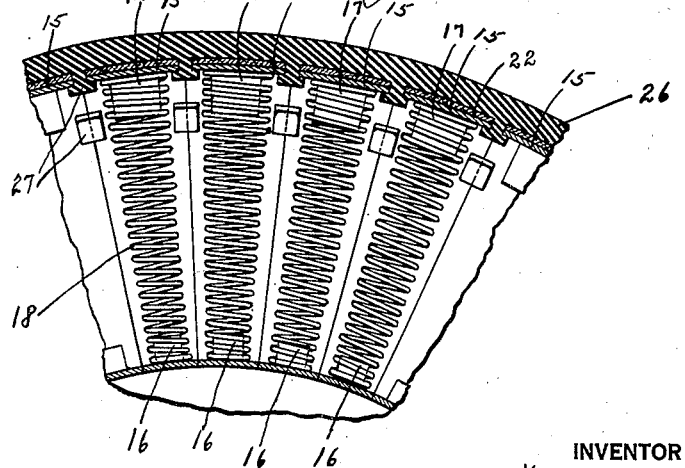
Figure 4 is a cross-sectional view showing the manner of assembly.

The next succeeding collar 15 is placed in abutting relation to the already mounted collar 15, the shank of the T's are now located in the openings defined by adjacent slots and the cross of each T bears against the inner faces of the two collars. This collar is now bolted to the rim as was the first collar. This general procedure is followed until the entire rim 11 is completely covered with the collars 15 as shown in Figures 1, 2 and 4, with each of the springs 18 being so disposed as to have its longitudinal center line on a radius of the wheel.

In this construction, after the wear-resistant member 26 has worn out, it may be readily replaced, by demounting the collars from the rim 11, removing the worn out member 26 therefrom and then the collars 15 are reassembled on the rim with a new element 26.

This invention is not to be limited to the exact details of construction herein described because said description is merely by way of illustration and not by way of limitation, it being apparent that various modifications and changes may be made within the scope of said invention, one of which may be the employment of a number of separate strips 26 instead of the single strip shown.

I claim:

1. In the combination with a wheel including a rim of a plurality of closed spring metal collars, each collar being a section of an annular hollow tube, with the sides of each section being on the radius through the center of the tube, each section having a plurality of slots through each edge thereof, a pair of lugs secured to said collar and diametrically disposed with respect to each other, a compression coiled spring in said collar, the ends of said spring secured to said lugs, bolts extending through openings in said rim and securing said collars to said rim, a rubber tread element mounted on said collars, locking means extending from said tread element and through said slots.

2. In combination with a wheel including a rim of a plurality of closed resilient metal collars, each collar being a section of an annular hollow tube, with the sides of each section being on the radius through the center of the tube, each section having a plurality of slots through each edge thereof, a pair of lugs secured to each of said collars and substantially diametrically opposed with respect to each other, a compression coiled spring in each of said collars, the ends of said springs surrounding said lugs, means extending through openings in said rim and securing said collars to said rim, a wear resistant tread element mounted on said collars, locking means extending from said tread element and through said slots.

VINCENT J. GIUSEFFI.